United States Patent [19]

Cole, Jr.

[11] 3,984,344

[45] Oct. 5, 1976

[54] POSITIVE DIELECTRIC ANISOTROPY LIQUID CRYSTAL COMPOSITIONS

[75] Inventor: Herbert S. Cole, Jr., Scotia, N.Y.

[73] Assignee: General Electric Company, Schenectady, N.Y.

[22] Filed: Apr. 30, 1975

[21] Appl. No.: 573,371

[52] U.S. Cl. .......................... 252/299; 350/160 LC
[51] Int. Cl.² ...................... C09K 3/34; G02F 1/13
[58] Field of Search ...................... 252/299, 408 LC; 350/160 LC

[56] References Cited
UNITED STATES PATENTS

| | | | |
|---|---|---|---|
| 3,770,653 | 11/1973 | Katagiri et al. | 252/408 |
| 3,876,286 | 4/1975 | Deutscher et al. | 252/299 |
| 3,915,883 | 10/1975 | Van Meter et al. | 252/299 |
| 3,919,105 | 11/1975 | Katagiri et al. | 252/299 |

FOREIGN PATENTS OR APPLICATIONS

| | | | |
|---|---|---|---|
| 2,181,943 | 12/1973 | France | 252/299 |
| 2,415,929 | 10/1974 | Germany | 252/299 |
| 2,261,548 | 6/1973 | Germany | 252/299 |
| 2,321,632 | 11/1974 | Germany | 252/299 |
| 2,306,739 | 8/1973 | Germany | 252/299 |
| 2,327,036 | 12/1973 | Germany | 252/299 |
| 86,269 | 12/1971 | Germany | 252/299 |
| 2,024,269 | 12/1971 | Germany | 252/299 |
| 4,988,791 | 8/1974 | Japan | 252/299 |

*Primary Examiner*—Benjamin R. Padgett
*Assistant Examiner*—T. S. Gron
*Attorney, Agent, or Firm*—Geoffrey H. Krauss; Joseph T. Cohen; Jerome C. Squillaro

[57] ABSTRACT

A liquid crystal composition of highly positive dielectric anisotropy comprises a mixture of a substantial fraction of substituted cyanophenylbenzoates and at least one (non-nitrile bearing) substituted phenyl benzoate, which may be a single and/or double ester. The large proportion of cyanophenylbenzoates causes the high positive dielectric anisotropy, and the use of a plurality of compounds reduces the melting point by eutectic action, also increasing the mesophase operating temperature range. The use of solely esters ensures high chemical stability, and the mixture is colorless.

11 Claims, No Drawings

POSITIVE DIELECTRIC ANISOTROPY LIQUID CRYSTAL COMPOSITIONS

This invention relates to liquid crystal materials, and more particularly, to mixtures of liquid crystal materials to form a liquid crystal composition having particularly desirable properties.

As is now well known, various materials exhibit a mesophase over a temperature range adjacent their nominal melting point at which they behave neither as true liquids nor as (crystalline) solids. Such materials are referred to as liquid crystals, of which there are three classes. One of these classes is the nematic type, in which the relatively long and thin molecules tend to line up parallel to each other when in their mesophase. By their very nature liquid crystal materials exhibit both optical and electrical anisotropies. As to their dielectric properties, nematic liquids may be classified as exhibiting either negative dielectric anisotropy or positive dielectric anisotrophy. The former type can be made to exhibit a dynamic scattering mode by the application of a suitable voltage across (a thin layer of) the material. On the other hand, in a positive dielectric anisotropy liquid crystal material, a suitable voltage causes the molecules to line up with the electric fields, so that optical devices utilizing such positive material are often referred to as field effect devices, since substantially no current flows and it is the electrical field that causes the change in the optical qualities of such positive dielectric materials. Such positive dielectric anisotropy liquid crystal materials are especially desirable because of their relatively rapid response to turning on and off the electric field and (only if their positive dielectric anisotropy is quite large) their response to relatively low voltages. Thus, highly positive materials (in which the difference between the dielectric constant measured parallel to the axis of the molecule minus the dielectric constant measured perpendicular to this axis is quite large, i.e., on the order of 15 or more) are ideally suited for matrix type operation at relatively low switching voltages, and thus are especially suitable in such environments, as for example, the digital display of a wristwatch, where such matrixing at low voltage is a valuable capability.

In addition to a high positive dielectric anisotropy, other desirable characteristics of a liquid crystal material include: a wide range of temperature (including room temperature, preferably at or near the mid-point of this range) at which the material is mesomorphic; high chemical stability as to, for example, moisture, heat, light (including ultraviolet as well as visible) and electric fields; and relatively high transparency at least of a thin layer, including preferably no spectrally selective absorption (i.e., the material is substantially colorless). Although certain liquid crystal materials and especially mixtures thereof are known which meet most of the desired characteristics enumerated above, it is believed that the present invention for the first time provides a liquid crystal composition that has all of the desired properties enumerated, and, in addition, is relatively inexpensive to make. Accordingly, a primary object of the instant invention is the provision of a liquid crystal composition which exhibits high positive dielectric anisotropy, a wide operating temperature range, including a substantial part of the range of each side of room temperature, high stability as to all of moisture, heat, light and electrical fields, and is substantially transparent and colorless.

The invention is characterized by comprising a mixture of substituted phenyl benzoates, of which at least a major fraction are substituted cyanophenylbenzoates (and in particular, 4'-substituted-4- cyanophenylbenzoates). More particularly, all of the ingredients of the mixture are esters so as to avoid the chemical instability exemplified by analogous compounds in which the two benzene rings are linked by other groups (such as Schiff bases or azoxy linked compounds).

Other objects and advantages of the invention will appear from the following detailed description of a few preferred embodiments of the invention.

A liquid crystal material according to the invention typically comprises at least one (and, in general, substantially more than one) substituted cyanophenylbenzoate, which contributes to the mixture a relatively high positive dielectric anisotropy and at least one (and, in general, also more than one) aliphatic-substituted phenylbenzoate, which contribute both a broadening of the operating range (i.e., between the crystal to nematic transition temperature, hereinafter called the melting point, and the nematic to isotropic transition temperature, hereinafter called the clearing point of the mixture and, additionally, tend to lower the melting point thereof. Further, as will be seen from the specific preferred examples given hereinafter, by utilizing a plurality of different substituted cyanophenylbenzoates the melting point of the mixture (of even these compounds alone) is reduced by forming a eutectic-like mixture, which reduces the melting point of the mixture to a temperature below that of the melting point of the lowest melting constituent of the mixture while causing the clearing point to be merely more or less the average of the clearing points; thus such a mixture not only reduces the melting point to a value below the melting point of any of the constituents but also tends to broaden the range since the clearing point is brought down (relative to, for example, the highest clearing point material) by more than an averaging type of effect. Because of the fact that the substituted cyanophenylbenzoates, although having the desirable property of extremely high positive dielectric anisotropy, exhibit, in general, both relatively high melting points (that is substantially above room temperature) and relatively narrow operating ranges (i.e., a clearing point that is higher by only a few degrees, such as from 5 to 12 or so degrees), it has been found extremely difficult (if not, in fact, impossible) to form a mixture thereof which has the desirably low melting point (i.e., well below room temperature) and a desirably large operating range. Accordingly, to a mixture of such substituted cyanophenylbenzoates, one adds at least one additional compound which exhibits a large range of temperatures between its melting and clearing point and also a compound (which, in theory, could be the same one, but in practice this has not been found feasible) which exhibits a relatively low melting point and at least a fairly large operating range. Finally, as will be seen from the examples hereinafter given, the melting point of the entire mixture is lower than the melting point of any of the constituents, including even the one or ones that are added primarily to lower the melting point, because of the eutecticlike effect caused by mixing these at least analogous compounds; further, because of the substantial lowering of the melting point of the mixture below that of the individual compounds on the one hand and the "averaging" effect of the individual clearing points of the compounds to form a compromise clearing point of the mixture, the mesophase temperature range of the mixture may actually be greater (and in some of the examples is, in fact, so) then the operating range of any of the individual components thereof.

As noted previously, all of the compounds utilized in the present invention are esters, thereby avoiding any problems of chemical stability relative to moisture, electric fields, heat and light. More specifically, all of the compounds utilized are substituted phenylbenzoates, and as noted above each of the mixtures contains a substantial proportion of substituted cyanophenylbenzoates (to give the positive dielectric anisotropy desired). In addition, all of the compounds are characterized by the fact that the substituted groups are always at the paraposition of both of the benzene rings at both ends of the phenylbenzoate compound. In other words, both the cyanophenylbenzoates and the aliphaticsubstituted phenyl benzoates are all 4'-substituted-4-substituted-phenylbenzoates. Thus, in general, compounds utilized in the present invention have the following general formula:

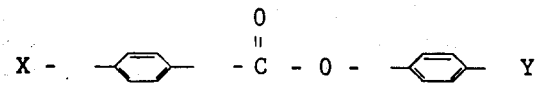

wherein the X may be an alkyl, alkoxy or carbonato group and the Y is either a nitrile group or else also a alkyl, alkoxy or carbonato. As mentioned before, the mixture will necessarily consist of at least a substantial proportion of one or more compounds in which the Y of the above formula is, in fact, a nitrile group (to obtain the desired positive dielectric anisotropy). Furthermore, although not essential to the invention, it will be understood hereinafter that all alkyl, alkoxy, etc., radicals hereinafter referred to are all straight chain (i.e., normal) in the specific examples hereinafter given.

One successful mixture of substituted cyanophenylbenzoates and (non-nitrile) substituted phenylbenzoates includes five substituted cyanophenylbenzoates and two other substituted phenylbenzoates as given in the following table which lists both the substituted groups at each end of the molecule, the melting and clearing points of each of the individual compounds and the amount (by weight) of each compound added to form the mixture.

EXAMPLE I

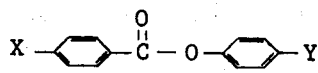

| | X | Y | SPECIFIC MESOPHASE | WT. FRACTION IN MIXTURE |
|---|---|---|---|---|
| 1 | $C_5H_{11}$ | CN | M.P. 62°, Cl. P (54) | .146 g. |
| 2 | $C_7H_{15}$ | CN | 45–57 | .208 g. |
| 3 | $C_8H_{17}$ | CN | 47–54 | .205 g. |
| 4 | $C_6H_{13}O$ | CN | 72–81 | .085 g. |
| 5 | $C_7H_{15}O$ | CN | 74–81 | .073 g. |
| 6 | $C_4H_9OCO$ | $OC_2H_5$ | 56–87 | .153 g. |

-continued

| | X | Y | SPECIFIC MESOPHASE | WT. FRACTION IN MIXTURE |
|---|---|---|---|---|
| 7 | $CH_3O$ | $C_5H_{11}$ | 29.5–43.5 | .130 g. |

As may be noted from the very first line of the above table, the first compound is monotropic, in that its clearing point is below its melting point; as is well understood in the liquid crystal art, this means that the solid crystal will melt directly to an isotropic liquid without passing through a mesophase stage, but upon cooling it will pass through a mesophase stage (although actually a supercooled liquid crystal state) before its recrystallizes as a solid. Thus, the mesophase may be reached in only one direction, namely, by cooling the liquid rather than melting the solid; nevertheless in a mixture the materials melting point may be sufficiently depressed so that is acts like normal or so-called enantiotropic material, that is, one in which it passes into a mesophase from either direction of temperature and will maintain this mesophase as long as the temperature does not fall below the melting point nor rise above the clearing point. It may be noted that all of the other compounds utilized in Example I are of this more conventional enantiotropic type. All of the compounds in Example I are readily made by known reactions, but an exemplary way of making these compounds will be given hereinafter for the purpose of completeness. It should be noted, however, that compound number 6 is readily available commercially and is designated EK-10482 by its manufacturer, Eastman Organic Chemical Company.

The melting point (i.e., the crystal-to-nematic transition temperature) of the above Example I is 5°C and the clearing point is 60°C. When this material was tested in a conventional liquid liquid crystal cell of a thickness of 12.5 microns, it exhibited a threshold voltage of only 1.0 volts, so that relatively low excitation voltages of say, about 3 volts is more than ample to drive a display device using this liquid crystal material. Furthermore, the response time was comparable to previous liquid crystal materials, namely, a rise time (i.e., display "on") of about 100 milliseconds and a decay time of about 400 milliseconds in a 12.5 micron thick cell (thinner cells would yield significantly faster response times). It should be noted that it is the fact that the threshold voltage is only 1 volt so that a display utilizing one or more cells containing such a liquid crystal material can be driven by an excitation voltage source of only about 3 volts (as would be available, for example, from a pair of small 1.5 volt batteries in series) which is a primary advantage of a mixture made according to the invention. This low threshold voltage (thus allowing a low voltage excitation source) is, of course, due to the relatively high positive dielectric anisotropy of the mixture, which, in turn, is due primarily to the high positive dielectric anisotropy of the (substituted) cyanophenylbenzoates, which are present at least in a substantial proportion and typically as the majority of components (by weight) in the liquid crystal mixture. In general, compounds of the last mentioned type will comprise at least about 1/3 of the mixture but will, in general, comprise no more than about 4/5 thereof (by weight). However, if too much of these compounds (containing a nitrile group) are present, either the resulting mixture will have a relatively low clearing point (if relatively low temperature cyanophenylbenzoates are used) or if cyanophenylbenzoates which have relatively high clearing points (and therefore necessarily relatively high melting points since the range of mesophase for all such pure compounds is relatively short) are used then the mixture may have too high a melting point to be useful. Further, there may be a tendency for some compounds to precipitate out of a mixture which contains almost exclusively cyanophenylbenzoates.

In Example I, it may be seen that the primary contribution of compound number 6 is to broaden the mesophase temperature of the entire mixture because of its own relatively large mesophase temperature range; while the contribution of the ester number 7 is both to assist in depressing the melting point of the mixture (since its relatively low melting point helps depress the melting point of the eutectic-type mixture even further) as well as contributing some broadening of the temperature range of the mesophase of the entire mixture. It is again pointed out that the general effect of mixing such different liquid crystal materials is to depress the melting point of the mixture below (and as may be seen from the Example I in this case well below) not only the average melting point of the individual compounds, but below the melting point of the most readily melted compound (in this case compound 7); while the clearing point of the mixture is more or less the average of the individual clearing points of the compounds making up the mixture. In sum, the nitrile-containing compounds cause the mixture to have a high positive dielectric anisotropy, the fact that more than one individual compound of this type (namely, substituted cyanophenylbenzoates) is utilized helps depress the melting point of the mixture below that of the melting point of the individual compounds by the eutectic effect, and the other compounds contribute either or both of further reduction of the melting point and broadening of the mesophase temperature range (such other compounds also being esters, specifically substituted phenylbenzoates, so as to avoid any chemically unstable ingredients in the mixture).

A very simple mixture to that of Example I was prepared and found to have the advantage of a somewhat broader operating nematic range of 2°–62°C. Because of its similarity to Example I, except for a difference in proportion as to compound number 1 and the addition of a new compound designated compound 8 to the mixture, this second example is set forth in abbreviated table form immediately below

EXAMPLE II

| Compound No. | 18X | Y | M.P. | C.P. | WEIGHT |
| --- | --- | --- | --- | --- | --- |
| 1 | $C_5H_{11}$ | CN | 62° | (54°) | .073g. |
| 2–7 Same as in Example I | | | | | |
| 8 | $C_5H_{11}O$ | $OC_6H_{13}$ | 55° | 84° | .073g. |

As may be seen from the above abbreviated tabular form of Example II, it consists of one-half as much of compound number 1 as does Example I and has exactly the same compounds and porportions as to compounds 2–7, but has added to the mixture a new compound number 8 in an amount equal to the diminished amount of compound number 1. The substitution of this relative broad temperature-range liquid crystal material, compound 8, for one-half the amount of the cyanophenylbenzoate of compound number 1 yields both a lower melting point for the mixture and an increased nematic operating temperature range. This is, of course, caused by the fact that compound number 8 itself has a relatively large operating range (especially as compared to compound number 1 which it partially replaces); on the other hand, since the total weight percentage of the nitrile-bearing compounds is reduced in Example II relative to Example I, the threshold voltage is slightly higher (about 1.15 volts versus the 1.0 volts of Example I), since the positive dielectric anisotropy of the mixture is not quite as high as in the earlier mixture. The resistivity of the mixture according to Example II has been measured to be about $5 \times 10^{10}$ ohms, and a mixture corresponding exactly to Example II has been successfully operated in the display cell of a wrist watch powered by two battery cells in series (i.e., at no more than 3 volts).

Another mixture which is closely related to both Examples I and II, that has been found to have desirable properties is the following mixture which has a melting point of −2°C, a clearing point of 63° C and a threshold voltage of 1.3 volts. As will be seen from the following abbreviated table, this Example III differs from Example II in that the remaining portion of compound number 1 has been replaced by an additional amount of compound number 8; thus, Examples I, II and III form a series in which one-half of compound number 1 was replaced by an equal amount (by weight) of compound number 8 to form Example II from Example I, and then the remaining half of compound number 1 was replaced by an equal weight amount of compound number 8 so as to form Example III. Because of the removal of the highly polar substituted cyanophenylbenzoate of compound number 1 and replacement by the double alkyloxy phenylbenzoate of compound 8, the mixtures of Examples II and III have increasing liquid crystal operating temperature ranges but also increasing threshold voltages (since the reduction in the amount of the highly polar compound 1 having a high positive dielectric anisotropy necessarily reduces the positive dielectric anisotropy of the mixture).

EXAMPLE III

| Compound No. | X | Y | M.P. | C.P. | WEIGHT |
| --- | --- | --- | --- | --- | --- |
| 1 | | | | | None |
| 2–7 Same as in Examples I and II | | | | | |
| 8 | $C_5H_{11}O$ | $OC_6H_{13}$ | 55° | 84° | .146g. |

In order to indicate the differences between Example III and Example II, the fact that no compound number 1 is present is emphasized by underlying the word "None"; and the fact that the amount of compound number 8 is doubled relative to Example II is emphasized by underlining the weight fraction thereof. As noted just previously, this change yields a larger operating temperature range and lower melting point but at the expense of a somewhat higher threshold voltage than the mixture of Example II.

Examples I-III above each discloses multicomponent mixtures. As exemplified therein, each compound in the mixture is preferably present in an amount between 5% and 25% of the total mixture, by weight.

A final exemplary mixture includes a submixture of the cyanophenylbenzoates of compounds 2 through 5 but without any compound 1 (as in Example III) and also includes the non-nitrile bearing ester of compound 6. However, this example differs in proportions of compounds 2–6 from all of the previous examples; and, in addition, is the only one to contain no compound number 7. Instead of the relatively low melting point and moderate mesophase temperature range compound number 7 and/or the higher melting point but larger mesophase temperature range ester of compound 8, this fourth example utilized a moderately low melting point, extremely large mesophase temperature range double ester, and specifically a chlorosubstituted as well as aliphatic substituted double ester. Specifically, the compound utilized is commercially available from Eastman Kodak, Organics Division, under the designation EK-11650 and is the specific double benzoate ester: p-pentylphenyl 2-chloro-4- (p-pentylbenzoyloxy)-benzoate. In the table giving Example IV, all of the data concerning compounds 2–6 is repeated although only the relative amount of thesse compounds included in the mixture is different from all of the preceding examples which also contain these same compounds; however, the new compound just named and assigned compound number 9 is set out in full since it does not exactly meet the general formula of the rest of the compounds since it not only includes a double ester bond, each involving an aromatic group, but it additionally has a chlorine connected to one of the aromatic rings. The complete formulation of this mixture is as follows:

EXAMPLE IV to the axis is about 20 units larger than the dielectric constant measured perpendicular to the axis of the molecule); for Example I, the average or net dielectric constants for the mixture were measured to be: a dielectric constant parallel to the molecular axis of 27.1, a dielectric constant perpendicular to the axis of 8.7 for a positive dielectric constant difference or positive dielectric anisotropy of +18.4. As previously stated, the non-nitrile group containing benzoate esters tend to have small negative dielectric anisotropy, where the difference taken in the same sense between the parallel and perpendicular dielectric constants is on the order of −.5. Conventional double esters also have small negative dielectric anisotropy, but compound 9 has a positive dielectric anisotropy of approximately +6. This is the reason that a large amount (approaching 40% by weight) of compound 9 may be added to a mixture without seriously depressing the high dielectric anisotropy contributed by compounds 2–5, which is in turn somewhat reduced by the about 10% addition of the slightly negative dielectric anisotropy compound 6. Thus, compound 9 may be added in relatively large quantities to increase the mesophase temperature range of the mixture beyond that which is usually obtained (i.e., the 75° range of the mixture of Example IV is substantially greater than that seen in commercially useful liquid crystal materials) without depressing the positive dielectric anisotropy of the mixture to a sufficient extent to cause the threshold voltage to rise substantially.

As may be seen by comparison of Example IV with Examples I through III, Example IV differs primarily from for instance, Example III in that both the esters of compounds 7 and 8 have been replaced by the chloro-

| Compound No. | X | Y | M.P. | C.P. | WEIGHT |
|---|---|---|---|---|---|
| 2 | $C_7H_{15}$ | CN | 45 | 57 | .138g. |
| 3 | $C_8H_{17}$ | CN | 47 | 54 | .264g. |
| 4 | $C_6H_{13}O$ | CN | 72 | 81 | .052g. |
| 5 | $C_7H_{15}O$ | CN | 74 | 81 | .045g. |
| 6 | $C_4H_9OCO$ (O double bond) | $OC_2H_5$ | 56 | 87 | .104g. |
| 9 | $C_5H_{11}$—⟨⟩—C(=O)—O—⟨⟩(Cl)—C(=O)—O—⟨⟩—$C_5H_{11}$ | | 40 | 122 | .397g. |

The mixture according to Example IV had a liquid crystal operating range of from 5° to 80°C, and a threshold voltage of 1.25 volts. As might be expected by the fact that the newly added compound 9 has an extremely large nematic operating range, the mixture (which contained a substantial quantity of compound 9 as may be seen from the right hand column above) had the unusually large range of 75° as its useful liquid crystal operating range. Because compound number 9 in contradistinction to unsubstituted esters (whether single or double) has itself a positive dielectric anisotropy (the other esters, in general, having relatively small negative dielectric anisotropy) of about +6, the mixture has a somewhat lower threshold voltage (i.e., has an aggregate positive dielectric anisotropy which is somewhat higher) than, for instance, the mixture of Example III. In general, the cyanophenylbenzoates have positive dielectric anisotropy of approximately +20 (that is, the dielectric constant measured parallel substituted double ester of compound 9, as well as reducing the amount of compound 6; in addition, the total amount of compound 9 is somewhat higher than the combined amounts of compounds 7 and 8 (plus even the reduction in the amount of compound 6) so that, in general, the amounts of the nitrile-bearing phenylbenzoates is also somewhat reduced (although it may be seen that compound number 3 is actually present in a larger amount in Example IV than in the other examples). Certain modifications should be obvious from studying the preceding four examples of successful mixtures. Thus, in Example IV, it would be expected that if compound 6 were either partially or completely substituted for by an equal amount of compound 7 (see the table of Example I), the resulting mixture would have a somewhat lesser mesophase temperature range, but would have a somewhat lower melting point (i.e., the melting point would be somewhat lower than 5° but the clearing point would be reduced below 80° by a somewhat larger amount). Since in some applications such a reduced melting point may be more desirable than the full operating range of 75°C obtained by Example IV, it is deemed obvious that this type of partial or complete substitution may be readily effected by one skilled in the art from the data contained in both the general explanation and the specific exemplary embodiments given in the tables. In fact, because of the extremely large operating temperature range of the commercially available compound 9, coupled with its relatively low melting point, it is entirely feasible to utilize compound 9 as the sole additive to a mixture of cyanophenylbenzoates and obtain both a reasonably low melting point and a very large operating temperature range. Further, as both explicity stated and implicit in Example IV a relatively large amount of compound 9 may be added (because it is itself of positive dielectric anisotropy) without severely depressing the high positive dielectric anisotropy of the nitrile-bearing phenylbenzoates.

All of the compounds in the above examples may be easily made from readily available starting materials. Basically, the reaction is the well known one between an appropriately substituted phenol and the appropriately substituted acid chloride. Thus, the various substituted cyanophenylbenzoates may be made by reacting the appropriate substituted benzoylchloride with p-hydroxybenzonitrile. Where the substituted acid chloride is not readily available, the corresponding substituted carboxylic acid, for example, may first be converted to the acid chloride by refluxing in excess thionyl chloride for about one hour. Thereafter, the excess thionyl chloride is evaporated by heating and the product utilized in the same manner as the commercially available acid chlorides.

Whether obtained commercially or made from the corresponding p-substituted benzoic acid, the p-substituted benzyl chloride and p-substituted phenol (where the substitutent may be the nitrile group as well as either an alkyl or an alkoxy radical) are than reacted according to the following equation:

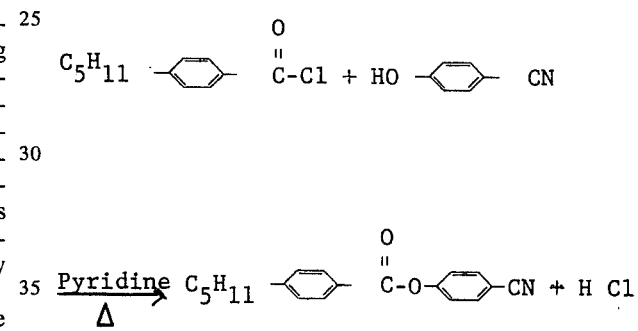

The reaction according to the above equation is carried out as follows. Equimolar quantites (say, .15M) of the substituted acid chloride and the phenol derivatives are mixed in pyridine (about 250 cc) and heated to 100°C for about 2 to 3 hours. The reaction mixture is then cooled and about 150 cc of water added, following which the reaction product is extracted with ether (for example, three 100 cc portions). The ether layer is then washed with water, dried over anhydrous magnesium sulfate and taken to complete dryness. The relatively impure or crude product is then recrystallized from either hexane or isopropyl alcohol. In these cases that the reaction product is still somewhat discolored by impurities, charcoal may be used to decolorize it. The now relatively pure compound is then recrystallized (utilizing either of the just mentioned solvents) several times to obtain a high purity final product.

All of the compounds (other than compounds number 6 and 9, which are commercially available as such) may be made according to the above reaction from readily available starting materials (namely, the appropriate substituted phenol and the appropriate substituted acid chloride, which, in turn, may be made in a manner previously noted from the corresponding substituted benzoic acid if the acid chloride is not directly readily available commercially). Since giving all of the specific reactions between the specific starting materials would be substantially redundant, only an exemplary reaction to form each type of compound (namely, compounds 1–5, 7 and 8) in the various examples will be given. Thus, to form any of the cyanophenylbenzoates of compounds 1–5, it is only necessary to react the appropriate aliphatic-substituted benzoyl chloride and p-hydroxybenzonitrile to form the desired substituted cyanophenylbenzoate. For example, reaction of p-pentylbenzoate chloride with p-hydroxybenzonitrile accordint to the above given reaction will yield compound 1 according to the following specific reaction.

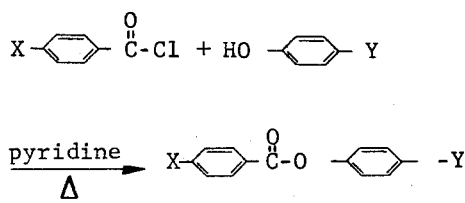

To form, for example, compound number 4 where the corresponding acid chloride is not readily commercially available, one would first react the readily available corresponding substituted benzoic acid, namely, p-hexyloxybenzoic acid with thionyl chloride to form p-hexyloxybenzoyl chloride which in turn would then be reacted with p-hydroxybenzonitrile as in the above reaction to form compound 4. The other alkyl-substituted cyanophenylbenzoates and the other alkoxy-substituted cyanophenylbenzoates may obviously be made in a directly analogous manner.

The non-nitrile containing substituted phenylbenzoates may be made by reacting the appropriate substituted acid chloride with the appropriate substituted phenol. For example, compound number 7 may be made by reacting anisoyl chloride (p-methoxybenzoyl chloride) with p-pentylphenol to form the compound 7 in an analogous manner to the reactions given above. Finally, compound 8 may be made by first forming p-pentyloxybenzoic acid the corresponding acid chloride in a manner previously explained, and then reacting this acid chloride with p-hexyloxyphenol to form compound 8 by the exterification reaction already given. Thus, any of the compounds utilized are either commercially available (compounds 6 and 9) or else are easily made from commercially available starting materials as explained above.

The desired mixtures may be readily formed from the individual compounds by suitable mixing at a temperature high enough to ensure that all of the materials are liquid. For example, the various esters may be weighed into a precleaned glass ampule and the components then warmed to about 80°C for about 10 minutes to insure proper mixing. Preferably, the resulting mixture is then filtered and the filtered mixture sealed off under vacuum (to insure avoidance of contamination). The mixture may then be utilized in the conventional manner for liquid crystal substances, namely, by being introduced into relatively thin cells having the necessary (transparent) electrodes as coatings on the interior of the flat plates (e.g., of glass) forming the walls of the cell. Application of a suitable (low frequency) voltage across the cell will then cause the molecules of the highly positive dielectric anisotropy material to line up along the electric field thereof so as to change the optical characteristics of the material relative to light passing through in the same direction as the gradient of the electric field, relative to the optical anisotropy exhibited by the molecules being at substantially 90° to this direction when no field is applied. By suitable combination with plane polarizers or other optical elements, the change in the liquid crystal material can cause a change from highly transparent to highly opaque (or vice versa) upon the application and removal of the voltage field, in this case one as low as about 1 volt or preferably at least twice this threshold voltage of something between 2 and 3 volts. For example, a cell containing a 12.5 micron thick layer of a mixture of Example I exhibited an optical transmission to light at 546nm when placed between parallel plane polarizers of only about 5% as long as the applied voltage (a 80Hz voltage, measured as an RMS value) was below 1.0 volts; its transmissivity increased very rapidly starting at this threshold voltage of 1.0 volts so that it was approximately 80% transmitting by the time the applied voltage was 1.5 volts; and then more slowly increased in its transmission value to over 90% substantially reaching the maximum transmission of about 95% at a voltage value of of no more than about 2.5 volts. Stated in other terms, the transmissivity versus applied voltage curve has almost horizontal portion up to nearly 1 volt (at about 5% transmission), an extremely rapidly rising almost straight portion from about 1 to 1.5 volts where the transmissivity changes on an almost vertical line from about 5% to about 85%, followed by a curved portion between about 1.5 volts and 2.5 volts where the transmissivity gradually increases from about 85% to 95%; and finally a substantially horizontal portion extending from 2.5 volts indefinitely at about 95% transmissivity. The mixtures of the other examples show similar highly desirable sharply increasing (or decreasing depending on the other optical elements) transmissivity over a very small voltage range (e.g., 1 volt) above a relatively low threshold voltage (e.g., from about 1 volt to about 1.3 volts as specifically mentioned for each of the examples given above). Thus, each of the example mixtures provides the desired sharp transition upon application of a relatively low voltage that is characteristic of nematic liquid crystal materials having very high positive dielectric anisotropies (typically from +15 up to +20 for the mixtures specifically described). Thus, mixtures according to the invention have all of the desired properties previously enumerated, which may be briefly summarized as high positive dielectric anistropy (so as to exhibit a low voltage threshold to the field effect transition), a wide range of operational temperature (including room temperature at least somewhat near the middle of this range), high chemical stability, since all of the materials are esters, to all of moisture, electric fields, heat and light, and finally they are all colorless.

Summing up the characteristics of the various compounds utilized in the various mixtures, it should be noted that all of the compounds are saturated aliphatic substituted esters (and more particularly phenylbenzoate esters) except for compound 9 which is an analogous double ester plus a single chloro substitution. More specifically each of the mixtures contains a plurality of substituted cyanophenylbenzoates, which contributes the high positive dielectric anisotropy; and more than one such compound is included so as to assist in lowering the melting point of the mixture by the eutectic action of such plural compounds. In addition, each of the mixtures of the examples includes at least one non-nitrile bearing ester (specifically para-substituted phenylbenzoates) which have relatively large mesophase temperature ranges and at least moderately low melting points; further, these added esters are characterized by having only slightly negative dielectric anisotropy and, in fact, in one case moderate positive dielectric anisotropy, so as not to affect in too great a manner the positive dielectric anisotropy contributed by the nitrile-bearing compounds (specifically those compounds numbered 1 through 5 in the above examples.). Because of the fact that all of the compounds are esters, the previously noted high chemical stability and lack of color are achieved, while the high positive dielectric anisotropy is, as just stated, a function of the relatively large portion of the very high positive dielectric anisotropy compounds bearing the nitrile groups; while the wide temperature range and relatively low melting point (specifically relative to room temperature) is accomplished by combining relatively wide temperature range materials and the general eutectic effect of combining a plurality of at least analogous compounds which reduces the melting point of the mixture below even the lowest melting point of the constituent compounds.

Thus, a mixture according to the invention may be summarized as comprising, as a major fraction, at least one and, in general, a plurality of substituted cyanophenylbenzoates and at least one substituted phenylbenzoate, which may be either a simple aliphatic (including alkyl, alkoxy or carbonate substituted phenylbenzoate or else a double ester, specifically of the substituted-(substituted benzoyloxy)-benzoate type.

What is claimed is:

1. A liquid crystal composition of high positive dielectric anisotropy formed of a mixture of seven nematic liquid compounds, each compound corresponding to a general chemical formula:

the mixture consisting of the specific compounds given in the following table as to the specific substituents of each compound thereof: in which the first five, nitrile-containing, compounds together constitute at least one-half by weight of the entire mixture

| COMPOUND NUMBER | X | Y |
|---|---|---|
| 1 | $C_5H_{11}$ | CN |
| 2 | $C_7H_{15}$ | CN |
| 3 | $C_8H_{17}$ | CN |
| 4 | $C_6H_{13}O$ | CN |
| 5 | $C_7H_{15}O$ | CN |
| 6 | $C_4H_9O\overset{O}{\overset{\|}{C}}O$ | $OC_2H_5$ |
| 7 | $CH_3O$ | $C_5H_{11}$ |

2. A liquid crystal composition according to claim 1, in which:
each compound is present in an amount between 5% and 25% of the total mixture, by weight.

3. A liquid crystal composition according to claim 2, in which: the seven compounds are present in approximately the following respective weight percentages:

| COMPOUND NUMBER | PERCENT BY WEIGHT |
|---|---|
| 1 | 15% |
| 2 | 21% |
| 3 | 20% |
| 4 | 9% |
| 5 | 7% |
| 6 | 15% |
| 7 | 13% | said composition having a mesophasic range from about +5°C to about +60°C.

4. A liquid crystal composition of high positive dielectric anisotropy formed of a mixture of eight nematic liquid compounds, each compound corresponding to a general chemical formula:

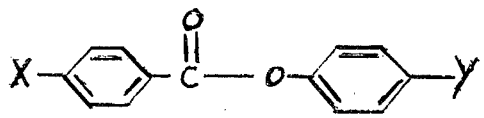

the mixture consisting of the specific compounds given in the following table as to specific substituents of each compound thereof in which the first five, nitrile-containing, compounds together constitute at least one-half by weight of the entire mixture:

| COMPOUND NUMBER | X | Y |
|---|---|---|
| 1 | $C_5H_{11}$ | CN |
| 2 | $C_7H_{15}$ | CN |
| 3 | $C_8H_{17}$ | CN |
| 4 | $C_6H_{13}O$ | CN |
| 5 | $C_7H_{15}O$ | CN |
| 6 | $C_4H_9O\overset{O}{\overset{\|}{C}}O$ | $OC_2H_5$ |
| 7 | $CH_3O$ | $C_5H_{11}$ |
| 8 | $C_5H_{11}O$ | $OC_6H_{13}$ |

5. A liquid crystal composition according to claim 4, in which:
each compound is present in an amount between 5% and 25% of the total mixture, by weight.

6. A liquid crystal composition according to claim 5, in which:
the eight compounds are present in approximately the following respective weight percentages:

| COMPOUND NUMBER | PERCENT BY WEIGHT |
|---|---|
| 1 | 7 ½% |
| 2 | 21% |
| 3 | 20% |
| 4 | 9% |
| 5 | 7% |
| 6 | 15% |
| 7 | 13% |
| 8 | 7 ½% | said compositions having a mesophasic range from about +2°C to about +62°C.

7. A liquid crystal composition of high positive dielectric anisotropy formed of a mixture of seven nematic liquid compounds, each compound corresponding to a general chemical formula:

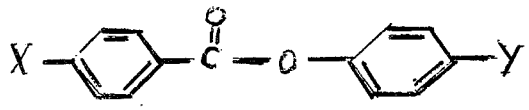

the mixture consisting of the specific compounds given in the following table as to specific substituents of each compounds thereof in which the first four, nitrile-containing, compounds together constitute at least one-half by weight of the entire mixture:

| COMPOUND NUMBER | X | Y |
|---|---|---|
| 1 | $C_7H_{15}$ | CN |
| 2 | $C_8H_{17}$ | CN |
| 3 | $C_6H_{13}O$ | CN |
| 4 | $C_7H_{15}O$ | CN |
| 5 | $C_4H_9O\overset{O}{\overset{\|}{C}}O$ | $OC_2H_5$ |
| 6 | $CH_3O$ | $C_5H_{11}$ |
| 7 | $C_5H_{11}O$ | $OC_6H_{13}$ |

8. A liquid crystal composition according to claim 7, in which:
each compound is present in an amount between 5% and 25% of the total mixture, by weight.

9. A liquid crystal composition according to claim 8, in which:
the seven compounds are present in approximately the following respective weight percentages:

| COMPOUND NUMBER | PERCENT BY WEIGHT |
|---|---|
| 1 | 21% |
| 2 | 20% |
| 3 | 9% |
| 4 | 7% |
| 5 | 15% |
| 6 | 13% |
| 7 | 15% | said composition having a mesophasic range from about −2°C to about +63°C.

10. A liquid crystal composition of high positive dielectric anisotropy formed of:
a sub-mixture of a plurality of the group of five nematic liquid compounds, each compound corresponding to a general chemical formula:

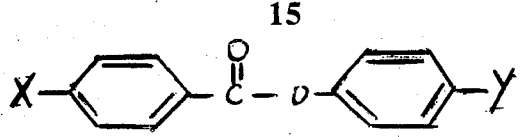

said sub-mixture consisting of the specific compounds given in the following table as to specific substituents of each compound thereof in which the first four, nitrile-containing, compounds together constitute at least one-half by weight of the sub-mixture and at least one-third by weight of the entire composition:

| COMPOUND NUMBER | X | Y |
| --- | --- | --- |
| 1 | $C_7H_{15}$ | CN |
| 2 | $C_8H_{17}$ | CN |
| 3 | $C_6H_{13}O$ | CN |
| 4 | $C_7H_{15}O$ | CN |
| 5 | $C_4H_9OCO$ | $OC_2H_5$ | and a double-ester nematic liquid compound having a chemical formula:

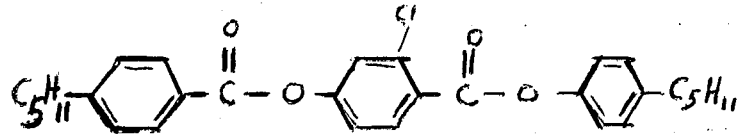

11. A liquid crystal composition according to claim 10, in which:
the six compounds are present in approximately the following respective weight percentages:

| COMPOUND NUMBER | PERCENT BY WEIGHT |
| --- | --- |
| 1 | 14% |
| 2 | 26% |
| 3 | 5% |
| 4 | 5% |
| 5 | 10% |
| 6 | 40% | said compositions having a mesophasic range from about +5°C to about +80°C.

* * * * *